(12) United States Patent
Sanders

(10) Patent No.: US 12,258,944 B2
(45) Date of Patent: Mar. 25, 2025

(54) METHOD FOR PRODUCING A PLAIN BEARING SLEEVE, PLAIN BEARING SLEEVE, PLAIN BEARING AND USE THEREOF

(71) Applicant: Schaeffler Technologies AG & Co. KG, Herzogenaurach (DE)

(72) Inventor: Bernhard Sanders, Roßtal (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 18/576,418

(22) PCT Filed: Jun. 13, 2022

(86) PCT No.: PCT/DE2022/100440
§ 371 (c)(1),
(2) Date: Jan. 4, 2024

(87) PCT Pub. No.: WO2023/284910
PCT Pub. Date: Jan. 19, 2023

(65) Prior Publication Data
US 2024/0369042 A1    Nov. 7, 2024

(30) Foreign Application Priority Data

Jul. 13, 2021 (DE) .................. 10 2021 118 010.4

(51) Int. Cl.
*F16C 17/02* (2006.01)
*B23B 1/00* (2006.01)
(Continued)

(52) U.S. Cl.
CPC .............. *F03D 80/703* (2023.08); *B23B 1/00* (2013.01); *F16C 17/02* (2013.01); *F16C 33/14* (2013.01);
(Continued)

(58) Field of Classification Search
CPC . B23B 1/00; B23B 2270/205; B23B 2215/12; B23B 2215/64; B23B 2215/72;
(Continued)

(56) References Cited

U.S. PATENT DOCUMENTS 5,924,798 A      7/1999  Usui
2015/0377288 A1* 12/2015 Carrerot .................. B24B 5/01
                                                              82/1.11

FOREIGN PATENT DOCUMENTS

AT        522155 A4     9/2020
AT        522814 A4     2/2021
(Continued)

*Primary Examiner* — Matthew P Travers

(57) ABSTRACT

A plain bearing sleeve includes an inner diameter, a sleeve length greater than the inner diameter, an outer diameter, and a wall thickness smaller than 8% of the inner diameter. A sleeve blank includes a longitudinal axis, an outer surface, an inner surface, a first end face, a second end face opposite the first end face, and at least three threaded holes arranged on the first end face. A method for producing the plain bearing sleeve includes clamping the outer surface at the first end face for rotation, machining the inner surface to the inner diameter, fixing the first end face at the at least three threaded holes for rotation, machining the outer surface to the outer diameter, clamping the inner surface at the second end face for rotation, and cutting a ring with the first end face and the at least three threaded holes from the sleeve blank.

5 Claims, 4 Drawing Sheets

(51) Int. Cl.
  *F03D 80/70* (2016.01)
  *F16C 33/14* (2006.01)
(52) U.S. Cl.
  CPC ....... *B23B 2215/12* (2013.01); *B23B 2215/64* (2013.01); *B23B 2270/205* (2013.01); *F05B 2240/54* (2013.01); *F16C 2204/12* (2013.01); *F16C 2220/62* (2013.01); *F16C 2360/31* (2013.01)
(58) Field of Classification Search
  CPC . B23B 2220/00; B23B 2270/54; Y10T 82/16; Y10T 82/10; F16C 2220/62; F16C 33/14; F16C 17/02; F16C 33/06; F03D 80/703; F05B 2240/54
  See application file for complete search history.

(56) References Cited

FOREIGN PATENT DOCUMENTS

| | | |
|---|---|---|
| CN | 108746559 A | 11/2018 |
| DE | 246904 A3 | 6/1987 |
| WO | 2020243763 A1 | 12/2020 |

* cited by examiner

METHOD FOR PRODUCING A PLAIN BEARING SLEEVE, PLAIN BEARING SLEEVE, PLAIN BEARING AND USE THEREOF

CROSS-REFERENCE TO RELATED APPLICATIONS

This application is the United States National Phase of PCT Appln. No. PCT/DE2022/100440 filed Jun. 13, 2022, which claims priority to German Application No. DE102021118010.4 filed Jul. 13, 2021, the entire disclosures of which are incorporated by reference herein.

TECHNICAL FIELD

The present disclosure relates to a method for producing a plain bearing sleeve with a length of the plain bearing sleeve, which is designed so as to be greater than an inner diameter of the plain bearing sleeve, and with a wall thickness of the plain bearing sleeve, which is dimensioned to be smaller than 8% of the inner diameter of the plain bearing sleeve. The disclosure further relates to a plain bearing sleeve produced according to said method, a plain bearing formed therewith and the use thereof.

BACKGROUND

Plain bearings and plain bearing sleeves or bushings are generally known and are used to enable rotational movements, pivoting movements and linear movements between two components arranged on the plain bearing sleeve with little friction. In this regard, a first component is arranged on the inner circumferential surface of the plain bearing sleeve, and a second component is arranged on the outer circumferential surface of the plain bearing sleeve.

AT 522 155 A4 discloses a plain bearing including an outer ring element and an inner ring element as connecting components, and a plain bearing element between the two ring elements.

Sleeves or bushings for plain bearings are usually produced by machining process, wherein the sleeve is clamped in a chuck and rotated about the center axis while a turning tool sequentially machines the inner and outer circumferential surfaces.

In particular, the production of especially thin-walled plain bearing sleeves entails the risk that the required dimensional tolerances for the finished component cannot be met. In addition, damage to the plain surface often occurs due to clamping of the component during the machining steps.

SUMMARY

The present disclosure provides a method for producing a plain bearing sleeve and a plain bearing sleeve produced according thereto, which allows for rapid and accurate production with low manufacturing tolerances and little surface damage. Furthermore, a plain bearing having such a plain bearing sleeve and its use shall also be specified.

The method according to the disclosure for producing a plain bearing sleeve with a length of the plain bearing sleeve, which is designed so as to be greater than an inner diameter of the plain bearing sleeve, and with a wall thickness of the plain bearing sleeve, which is dimensioned to be smaller than 8% of the inner diameter of the plain bearing sleeve, includes the following steps:

a) providing a sleeve blank, wherein at least three threaded holes are arranged on a first end face of the sleeve blank;

b) clamping the sleeve blank on one side at its sleeve outer diameter at a first end of the sleeve blank associated with the first end face in such a manner that the sleeve blank is rotatable about its sleeve longitudinal axis, and machining the sleeve inner diameter of the sleeve blank to the dimension of the inner diameter of the plain bearing sleeve;

c) screwing of the sleeve blank on the end face by means of the threaded holes in such a manner that it can be rotated about its sleeve longitudinal axis and machining the sleeve outer diameter of the sleeve blank, wherein the wall thickness of the plain bearing sleeve is formed; and d) clamping the sleeve blank on one side at the inner diameter at a second end of the sleeve blank opposite to the first end and cutting off a ring including the threaded holes from the sleeve blank forming the plain bearing sleeve with the length.

The method provides that the plain bearing sleeve can be produced with a low wall thickness tolerance of ±0.005 mm. As a result, in large plain bearings, such as those used in the wind energy sector, high running smoothness and low wear can be achieved over the required running times of such an installation.

In step c) the machining process of the sleeve outer diameter of the sleeve blank may be performed by turning. Also in step b), the machining process of the sleeve inner diameter of the sleeve blank may be performed by turning. Turning makes it possible to achieve an average roughness value (arithmetic mean of the deviations from the center line in μm) of Ra<0.6 at the outer diameter of the plain bearing sleeve and an average roughness value of Ra<1.6 at the inner diameter of the plain bearing sleeve. Furthermore, when using such a plain bearing sleeve in a plain bearing, this contributes to high running smoothness and a long service life.

More than three threaded holes may be provided on the first end face of the sleeve blank, e.g., six or more threaded holes. This enables uniform screwing of the sleeve blank over the first end face and uniform and smooth rotation of the sleeve blank about its sleeve longitudinal axis during the machining process of the sleeve outer diameter.

The wall thickness of the plain bearing sleeve may be dimensioned to be smaller than about 5% of the inner diameter of the plain bearing sleeve.

The present disclosure further provides for the plain bearing sleeve produced by means of the method according to the disclosure, with a length of the plain bearing sleeve which is designed so as to be greater than an inner diameter of the plain bearing sleeve, and with a wall thickness of the plain bearing sleeve, which is dimensioned to be smaller than 8%, e.g., smaller than about 5%, of the inner diameter of the plain bearing sleeve. As already explained with regard to the method, the plain bearing sleeve produced according to this method has a low wall thickness tolerance of ±0.005 mm. As a result, in large plain bearings having such a plain bearing sleeve, such as those used in the wind energy sector, high running smoothness and low wear can be achieved over the required running times of such an installation.

The length of the plain bearing sleeve may be designed so as to be greater than 300 mm and is, for example, in the range of 300 to 600 mm. The wall thickness of the plain bearing sleeve may be up to 20 mm, for example.

The plain bearing sleeve may be made of bronze. This material has good sliding properties and can be machined particularly well using the method according to the disclosure.

The present disclosure further provides for the plain bearing including a plain bearing sleeve according to the disclosure. In this regard, the plain bearing includes an inner ring and an outer ring, and the plain bearing sleeve is used, for example, as the inner ring. However, the plain bearing sleeve can alternatively or additionally also form the outer ring of the plain bearing.

The use of a plain bearing according to the disclosure in the region of a bearing of a wind turbine, e.g., a rotor bearing for the rotor of a wind turbine, has proved advantageous. However, a use in large plain bearings for other applications, for example in the field of ships, cranes, railroads or heavy industry, is also possible.

BRIEF DESCRIPTION OF THE DRAWINGS

FIG. 1 shows a plain bearing sleeve in a three-dimensional view,

FIG. 2 shows a sleeve blank in a three-dimensional view,

FIG. 3 shows the sleeve blank according to FIG. 2 with threaded holes,

FIG. 4 shows a longitudinal section through a plain bearing with the plain bearing sleeve according to FIG. 1, and FIG. 5 shows a wind turbine.

DETAILED DESCRIPTION

Figure 1:
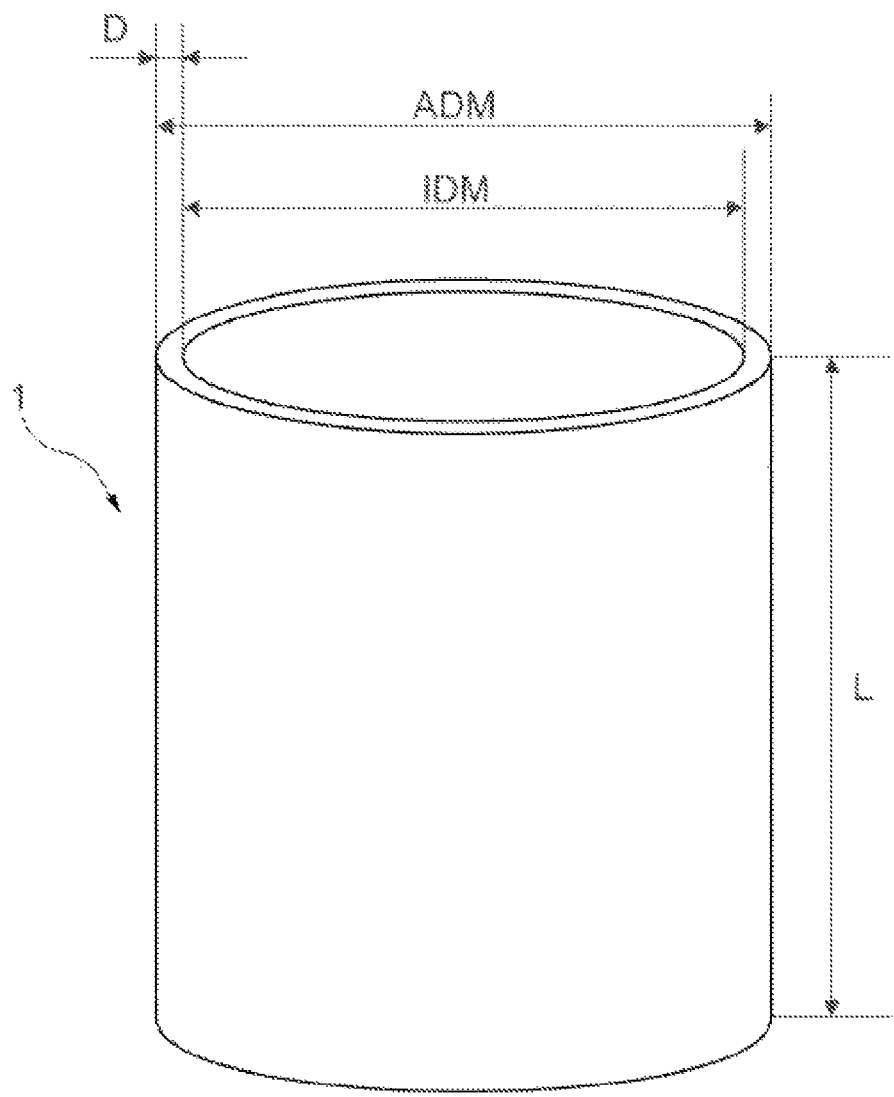
FIGS. 1 to 5 are intended to explain, by way of example, a method according to the disclosure, the plain bearing sleeve formed therewith and its use. In the figures.

FIG. 1 shows a plain bearing sleeve 1 in a three-dimensional view. The plain bearing sleeve 1 has a length L and an outer diameter ADM. The length L is designed so as to be greater than an inner diameter IDM of the plain bearing sleeve 1. In this case, a wall thickness D of the plain bearing sleeve 1 is dimensioned to be smaller than 5% of the inner diameter IDM of the plain bearing sleeve 1.

Figure 2:
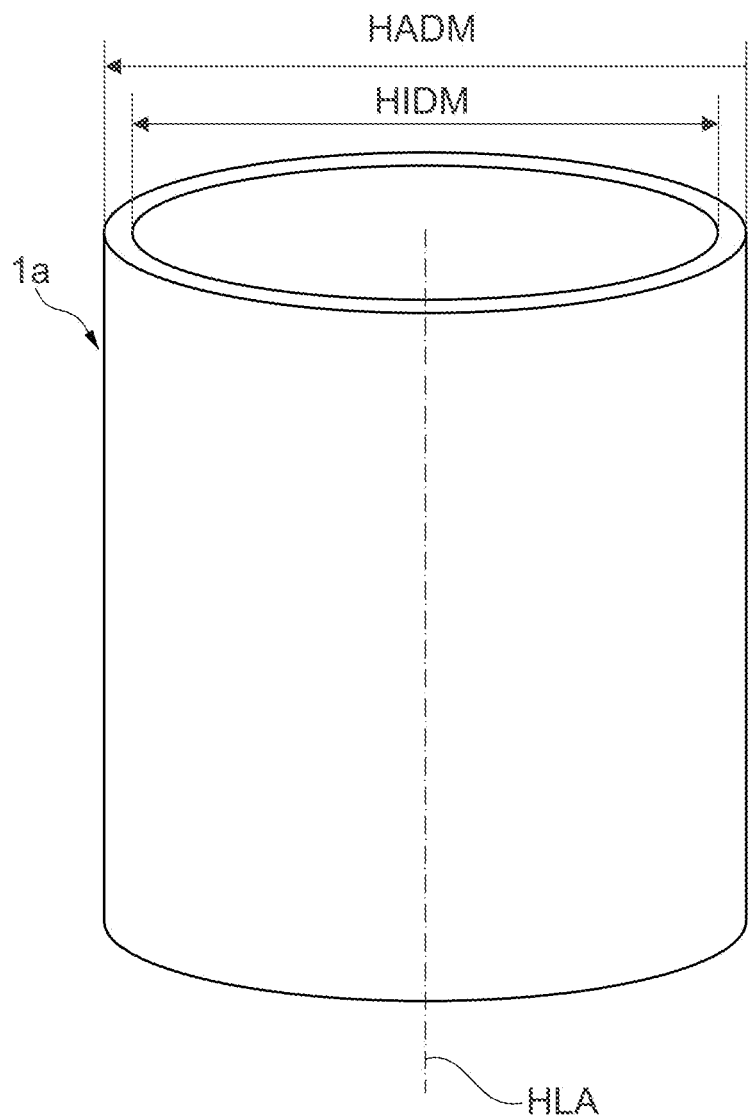
Figure 3:
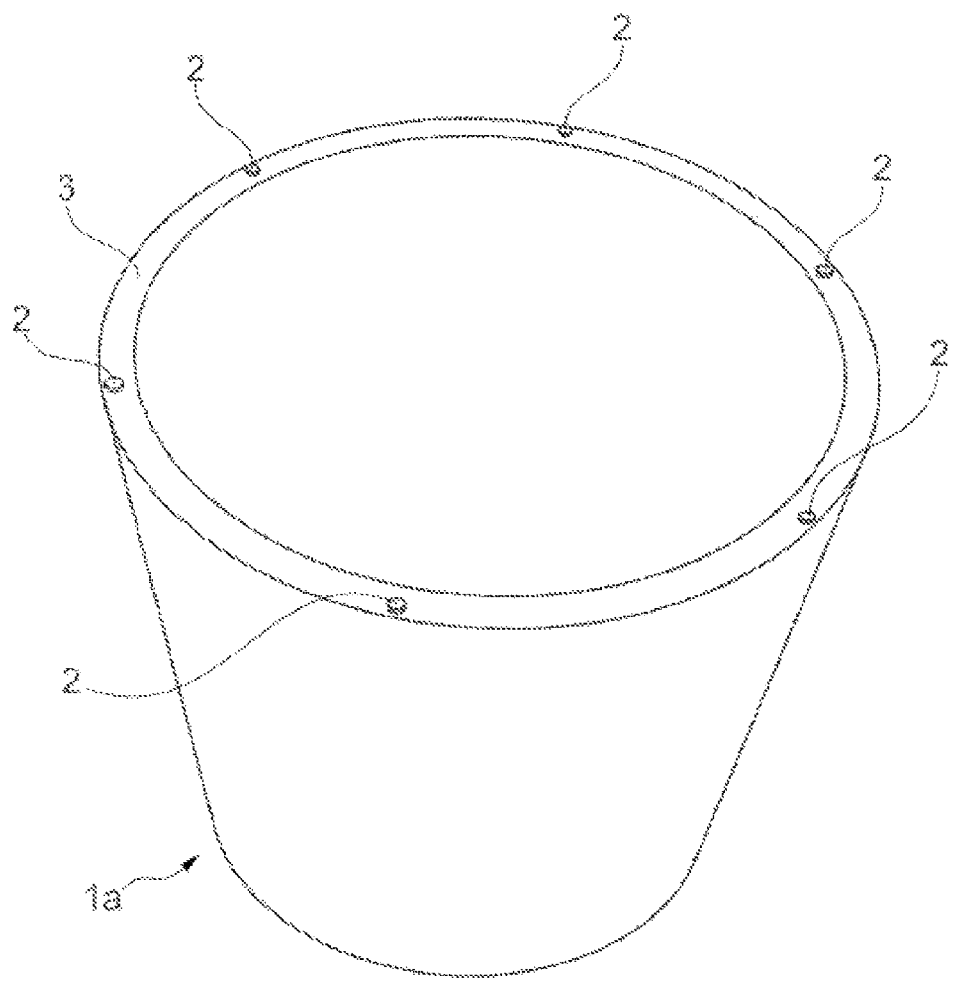

The plain bearing sleeve 1 is produced by means of a method from a sleeve blank 1a according to FIG. 2. The method includes the following steps:

a) providing a sleeve blank 1a, wherein at least three threaded holes 2 (see FIG. 3) are arranged on a first end face 3 of the sleeve blank 1a;

b) clamping the sleeve blank 1a on one side at its sleeve outer diameter HADM (see FIG. 2) at a first end of the sleeve blank 1a associated with the first end face 3 in such a manner that the sleeve blank 1a is rotatable about its sleeve longitudinal axis HLA, and machining the sleeve inner diameter HIDM of the sleeve blank 1a to the dimension of the inner diameter IDM of the plain bearing sleeve 1;

c) screwing the sleeve blank 1a on the end face by means of the threaded holes 2 in such a manner that it can be rotated about its sleeve longitudinal axis HLA and machining the sleeve outer diameter HADM of the sleeve blank 1a, forming the wall thickness D of the plain bearing sleeve 1; and d) clamping the sleeve blank 1a on one side at the inner diameter IDM at a second end of the sleeve blank 1a opposite to the first end and cutting off a ring including the threaded holes 2 from the sleeve blank 1a forming the plain bearing sleeve 1 with the length L.

Figure 4:
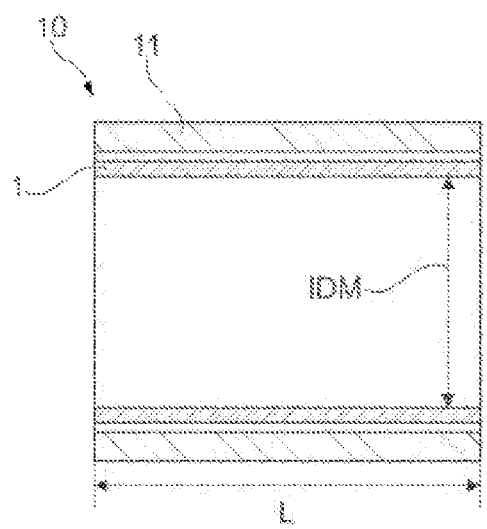

FIG. 4 shows a longitudinal section through a plain bearing 10 with the plain bearing sleeve 1 according to FIG. 1 as an inner ring, and an outer ring 11. However, the plain bearing sleeve 1 can alternatively or additionally also form the outer ring 11 of the plain bearing 10.

Figure 5:
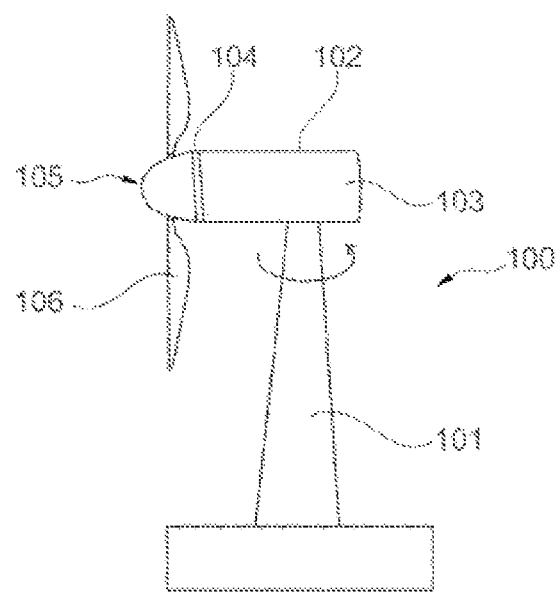

FIG. 5 shows a schematic representation of a wind turbine 100 for generating electrical energy from wind energy. The wind turbine 100 includes a nacelle 102, which is rotatably arranged on a tower 101. The nacelle 102 has a nacelle housing 103. A generator of the wind turbine 100 is located in the nacelle housing 103. A rotor 105 including rotor blades 106 is rotatably mounted on the nacelle housing 103 via a rotor bearing 104. In this regard, a plain bearing 10 (compare, for example, FIG. 4) with a plain bearing sleeve 1 (compare, for example, FIG. 1) is used in the region of the rotor bearing 104.

REFERENCE NUMERALS

1 Plain bearing sleeve
1a Sleeve blank
2 Threaded hole
3 First end face
10 Plain bearing
11 Outer ring
D Wall thickness of the plain bearing sleeve
L Length of the plain bearing sleeve
IDM Inner diameter of the plain bearing sleeve
ADM Outer diameter of the plain bearing sleeve
HADM Sleeve outer diameter of the sleeve blank
HIDM Sleeve inner diameter of the sleeve blank
HLA Sleeve longitudinal axis
100 Wind turbine
101 Tower
102 Nacelle
103 Nacelle housing
104 Rotor bearing
105 Rotor
106 Rotor blades

The invention claimed is:

1. A method for producing a plain bearing sleeve with a length (L) of the plain bearing sleeve, which is designed so as to be greater than an inner diameter (IDM) of the plain bearing sleeve, and with a wall thickness (D) of the plain bearing sleeve, which is dimensioned to be smaller than 8% of the inner diameter (IDM) of the plain bearing sleeve, comprising:

a) providing a sleeve blank, wherein at least three threaded holes are arranged on a first end face of the sleeve blank;

b) clamping the sleeve blank on one side at a sleeve outer diameter (HADM) at a first end of the sleeve blank associated with the first end face in such a manner that the sleeve blank is rotatable about a sleeve longitudinal axis (HLA), and machining a sleeve inner diameter (HIDM) of the sleeve blank to the dimension of the inner diameter (IDM) of the plain bearing sleeve;

c) screwing of the sleeve blank on the end face by means of the threaded holes in such a manner that it can be rotated about its sleeve longitudinal axis (HLA) and machining the sleeve outer diameter (HADM) of the sleeve blank, wherein the wall thickness (D) of the plain bearing sleeve is formed; and d) clamping the sleeve blank on one side at the inner diameter (IDM) at a second end of the sleeve blank opposite to the first end, and cutting off a ring comprising the threaded holes from the sleeve blank forming the plain bearing sleeve with the length (L).

2. The method according to claim 1, wherein in step c) the machining process of the sleeve outer diameter (HADM) of the sleeve blank is performed by turning.

3. The method according to claim 1, wherein in step b) the machining process of the sleeve inner diameter (HIDM) of the sleeve blank is performed by turning.

4. A method for producing a plain bearing sleeve, the plain bearing sleeve comprising:
   a sleeve inner diameter;
   a sleeve length greater than the sleeve inner diameter;
   a sleeve outer diameter; and
   a wall thickness smaller than eight percent (8%) of the sleeve inner diameter, the method comprising:
   providing a cylindrical sleeve blank comprising:
      a longitudinal axis;
      an outer surface;
      an inner surface;
      a first end face;
      a second end face opposite the first end face; and
      at least three threaded holes arranged on the first end face;
   clamping the outer surface at the first end face for rotation about the longitudinal axis;
   machining the inner surface to the sleeve inner diameter;
   fixing the first end face at the at least three threaded holes for rotation about the longitudinal axis;
   machining the outer surface to the sleeve outer diameter, thereby forming the wall thickness;
   clamping the inner surface at the second end face for rotation about the longitudinal axis; and
   cutting a ring comprising the first end face and the at least three threaded holes from the cylindrical sleeve blank, thereby forming the sleeve length.

5. The method of claim 4, wherein the machining is performed by turning.

* * * * *